US012759249B2

(12) United States Patent
Haque et al.

(10) Patent No.: US 12,759,249 B2
(45) Date of Patent: Oct. 13, 2026

(54) OPTIMIZATION OF PROCESS PARAMETERS FOR LENS WITH MICRO-LENS DESIGN

(71) Applicant: ESSILOR INTERNATIONAL, Charenton-le-Pont (FR)

(72) Inventors: Tareq Haque, Dudley, MA (US); Timothy Holton, Dudley, MA (US); Thomas Clark, Stamford, CT (US)

(73) Assignee: Essilor International, Charenton-le-pont (FR)

( * ) Notice: Subject to any disclaimer, the term of this patent is extended or adjusted under 35 U.S.C. 154(b) by 180 days.

(21) Appl. No.: 18/561,514

(22) PCT Filed: May 17, 2022

(86) PCT No.: PCT/EP2022/063342
§ 371 (c)(1),
(2) Date: Nov. 16, 2023

(87) PCT Pub. No.: WO2022/243327
PCT Pub. Date: Nov. 24, 2022

(65) Prior Publication Data
US 2024/0227330 A1 Jul. 11, 2024

(30) Foreign Application Priority Data
May 19, 2021 (EP) .................................... 21305658

(51) Int. Cl.
*B29D 11/00* (2006.01)
*B29C 33/02* (2006.01)
(Continued)

(52) U.S. Cl.
CPC .......... *B29D 11/0049* (2013.01); *B29C 33/02* (2013.01); *B29C 35/007* (2013.01);
(Continued)

(58) Field of Classification Search
CPC .......... B29D 11/0049; B29D 11/00125; B29C 33/02; B29C 35/007; B29C 45/561
See application file for complete search history.

(56) References Cited

U.S. PATENT DOCUMENTS 4,664,854 A 5/1987 Bakalar
4,828,769 A * 5/1989 Maus .................. B29C 45/2703 264/328.8
2020/0316886 A1* 10/2020 Chiu ........................ G02B 3/08

FOREIGN PATENT DOCUMENTS

EP 846542 A1 * 6/1998
EP 0873238 A1 10/1998
(Continued)

OTHER PUBLICATIONS

Essilor's Stellest Lens Shown to Slow Myopia Progression in Children in Oneyear Interim Clinical Trial, Online:https://reviewofmm.com/essilors-stellest-lens-shown-to-slow-myopia-progression-in-children-in-one-year-interim-clinical-trial/, Sep. 28, 2020, 7 pages.
(Continued)

*Primary Examiner* — Mathieu D Vargot
(74) *Attorney, Agent, or Firm* — NIXON & VANDERHYE

(57) ABSTRACT

Injection-compression molding apparatus and methods to form a lens in a mold insert by an injecting a polymer into an internal cavity of the mold insert until a pressure of the internal cavity exceeds a predetermined force value, the first mold side being fixed and the second mold side being moveable and configured to apply a force generating the internal cavity pressure. The method includes controlling a first temperature of the first mold side to be in a range of 4 degrees Fahrenheit to 10 degrees Fahrenheit greater than a second temperature of the second mold side and controlling
(Continued)

a coining compression distance of the second mold side to be in a range of 0.008 inches to 0.018 inches.

5 Claims, 5 Drawing Sheets

(51) Int. Cl.
*B29C 35/00* (2006.01)
*B29C 45/56* (2006.01)
*B29L 11/00* (2006.01)

(52) U.S. Cl.
CPC ...... *B29C 45/561* (2013.01); *B29D 11/00125* (2013.01); *B29L 2011/0016* (2013.01)

(56) References Cited

FOREIGN PATENT DOCUMENTS

| | | | | |
|---|---|---|---|---|
| EP | 1273424 | A1 | | 1/2003 |
| EP | 1314544 | A2 | | 5/2003 |
| JP | S6119327 | A | | 1/1986 |
| JP | H09277327 | A | | 10/1997 |
| JP | 2002337206 | | * | 11/2002 |
| KR | 20160107066 | A | | 9/2016 |

OTHER PUBLICATIONS

Polycarbonte (PC) Resin Panlite & Multilon, Online: https://www.teijin-resin.com/products/pc, Retrieved Oct. 26, 2023, 4 pages.
International Search Report for PCT/EP2022/063342 mailed Sep. 5, 2022, 4 pages.
Written Opinion of the ISA for PCT/EP2022/063342 mailed Sep. 5, 2022, 7 pages.

* cited by examiner

OPTIMIZATION OF PROCESS PARAMETERS FOR LENS WITH MICRO-LENS DESIGN

This application is the U.S. national phase of International Application No. PCT/EP2022/063342 filed May 17, 2022, which designated the U.S. and claims priority to EP patent application Ser. No. 21/305,658.3 filed May 19, 2021, the entire contents of each of which are hereby incorporated by reference.

FIELD OF THE INVENTION

An injection molding process with temperature control used in a manufacturing production environment for lenses.

BACKGROUND OF THE INVENTION

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the manufacture of curved lenses, an injection molding process may be used in which a mold insert is compressed while material (e.g., plastic) is injected into the mold. However, in order to form microstructures, such as microlenses on a surface of the lens, the temperature of the insert should be tightly controlled while the insert is under a high compressive force.

SUMMARY OF THE INVENTION

The present disclosure relates to a method for injection-compression molding a lens into a mold insert including an internal cavity, a sidewall, and a gate, comprising injecting a polymer into the internal cavity formed by a coupled first mold side and second mold side of the mold insert via the gate until a pressure of the internal cavity exceeds a predetermined force value, the first mold side being fixed and the second mold side being moveable and configured to apply a force generating the internal cavity pressure, wherein the method further comprises controlling a first temperature of the first mold side to be in a range of 4 degrees Fahrenheit to 10 degrees Fahrenheit greater than a second temperature of the second mold side and controlling a coining compression distance of the second mold side to be in a range of 0.008 inches to 0.018 inches. Advantageous aspects of the method according to the present disclosure are disclosed in the appended claims.

The method further includes controlling the temperatures of the mold sides by flowing coolant at the first temperature through a first coolant channel in the first mold side; and/or flowing coolant at the second temperature through a second coolant channel in the second mold side. The present disclosure additionally relates to an injection-compression molding apparatus for molding a lens. Advantageous aspects of the injection-compression molding apparatus for molding a lens according to the present disclosure are disclosed in the appended claims. The present disclosure additionally relates to an injection-compression molding system for molding a lens. Advantageous aspects of the injection-compression molding system for molding a lens according to the present disclosure are disclosed in the appended claims.

Note that this summary section does not specify every feature and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1A:
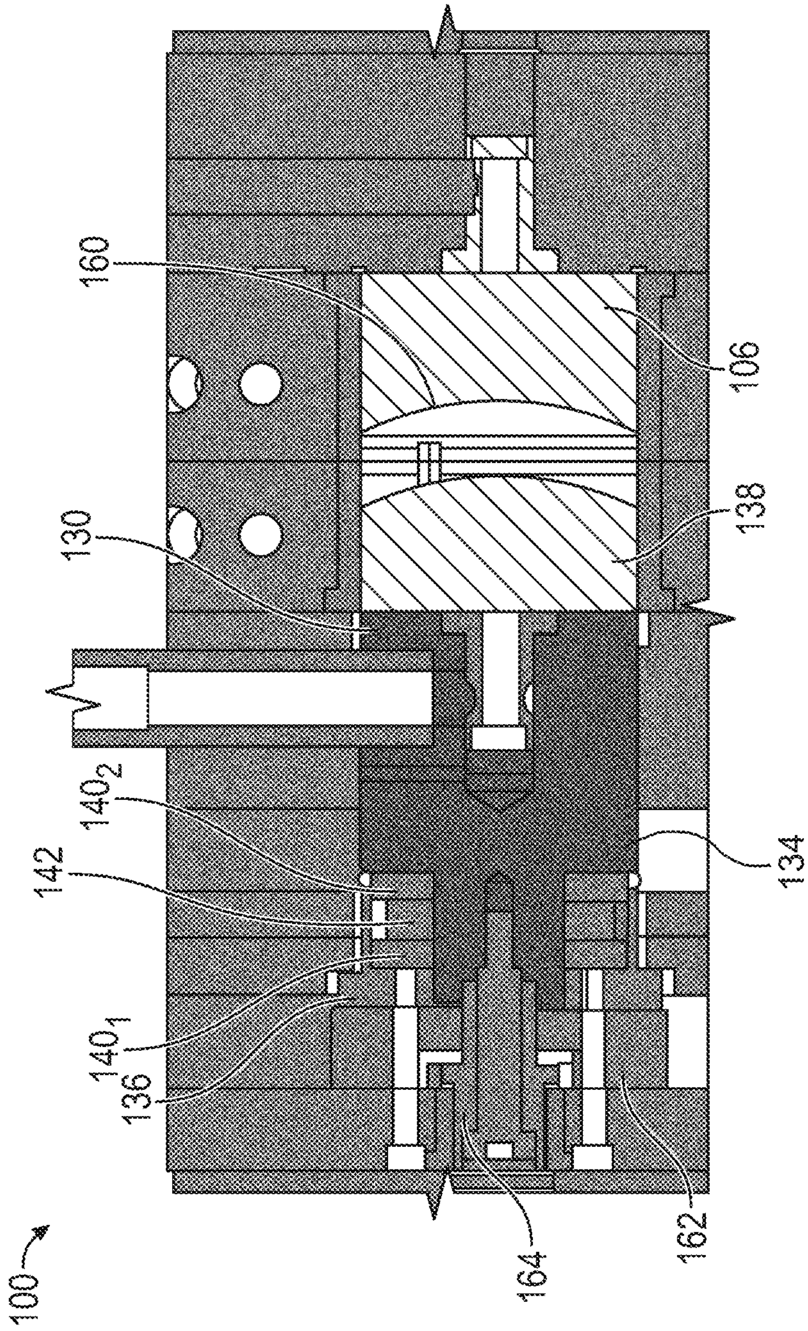
FIG. 1A depicts a block diagram of the general features of an injection molding apparatus within the scope of the present disclosure.

A lens which has microstructures such as microlenses (also known as "lenslets") formed on the surface may provide prescriptive correction through a single vision zone and myopia correction through a constellation of aspherical lenslets in ring formations. This type of lens may create a volume of signal that slows down the elongation of the eye. The power on each ring may be designed to guarantee a volume of signal always in front of the retina and following its shape to achieve consistent myopia slowdown. A non-limiting example of a lens having aspherical lenslets in ring formation is a Stellest™ lens (See: "Essilor's Game-Changing Stellest™ Lens Shown To Slow Down Myopia Progression In Children By More Than 60%, After One-Year Interim Clinical Trial", 28 Sep. 2020; Newsletter, Essilor, incorporated herein by reference in its entirety).

During the manufacturing process of microstructures such as microlenses, such as those associated with the Stellest™ lens, it is valuable to maintain and achieve an acceptable front curve design of the microlens and a targeted global power, and to monitor any potential departure of the microlens array from acceptable standards, to meet product specifications during and after the manufacturing process. Temperature control of the mold insert during injection is of high importance. However, previous work has not included using different temperatures for different regions of the mold insert.

The present disclosure is able to address shortcomings in the art, particularly with the solutions set forth in the claims.

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The following disclosure provides many different variations, or examples, for implementing different features of the provided subject matter. Specific examples of components and arrangements are described below to simplify the present disclosure. These are, of course, merely examples and are not intended to be limiting nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as “top,” “bottom,” “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for the sake of clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In the present disclosure, the term “coining” refers to an injection-compression molding process which extends injection molding capabilities by compressing an injection mold.

The present disclosure describes a management system for injection molding process parameters, such as temperature, pressure and coining during manufacturing, which achieves both good front curve replication as well as a targeted average global power. These process parameters achieve an acceptable front curve and global power of the micro-lens within production process capability values, Cpk.

The mold insert has a front curvature and a back curvature, or base curve, which form the lens structure. The front curvature may include microlenses, such as described above for, but not limited to, myopia correction. The halves of the mold insert are closed by clamping while a resin such as polycarbonate resin is injected under pressure. As the injection pressure increases and subsides, the faces of the mold insert are vented until the mold can be fully closed.

Unlike some other thermoplastics, polycarbonate can undergo large plastic deformations without cracking or breaking. In a non-limiting example, the polycarbonate resin may be mixtures of polymers, such as polycarbonates, polycarbonate/copolyester blends, acrylics, such PMMA, cyclic olefin copolymers, amorphous polyamides, polyesters, copolyesters, polyurethanes, and the like. The resin may be made to color specifications, i.e., for colored lenses. In another non-limiting example, the polycarbonate resin may be Teijin 1270ZT, (See: Teijin Panlite 1250ZT, Sold by the Teijin company of Osaka, Japan.

Semi-finished single vision (SFSV) lenses are those marketed in bulk to opticians and eyeglass makers. The standard process parameters for SFSV lenses are relatively close to these process parameters (i.e., temperature, pressure and coining) and can potentially meet optic specifications (i.e., good front curve replication and targeted average global power), but stability of the process and the process capability (Cpk) can be lower than desired for production needs. A Cpk or Cp>1.0 indicates good reproducibility.

Table 1 shows process parameters for conventional SFSV lenses.

TABLE 1

Standard Process Parameters for SFSV lenses

| Items | Application | Configuration (SKU) | Unit | Specification & Tolerance | Specification 3.25 [L] |
|---|---|---|---|---|---|
| 1 | Applicable | Lens diameter | mm | | 76 |
| 2 | Applicable | Lens cavities | qty | | 8-10 |
| 3 | Applicable | Process type | — | | IMC, IE |
| 4 | Applicable | Insert type CC/Coating | — | | Metal |
| 5 | Applicable | Insert type CX/Coating | — | | Metal |
| Barrel Temp | | | | | |
| 6 | Applicable | N - Nozzle | C. | Keep at nominal [+/− 5° C. | 260 |
| 7 | Applicable | B1 - Front | C. | | 265 |
| 8 | Applicable | B2 - Middle | C. | | 265 |
| 9 | Applicable | B3 - Rear | C. | | 260 |
| 10 | Applicable | H - Feed | C. | | 255 |
| 11 | Applicable | Throat Temp | C. | | 60 |

TABLE 1-continued

| Standard Process Parameters for SFSV lenses | | | | | |
|---|---|---|---|---|---|
| Items | Application | Configuration (SKU) | Unit | Specification & Tolerance | Specification 3.25 [L] |
| Plastification | | | | | |
| 12 | Applicable | Back Pressure (ACT) | MPa | +/−5 | 8 |
| 13 | Applicable | Screw Speed (AC) | rpm | +/−6 | 10 |
| 14 | Applicable | Mold A | C. | +/−5 | 136 |
| 15 | Applicable | Mold B. | C. | +/−5 | 136 |
| Injection Time | | | | | |
| 16 | Refer | Injection Times | sec | +/−10 | 15 |
| 17 | Applicable | Cooling Times | sec | +/−20 | |
| 18 | Applicable | Cycle Times (ACT) | sec | +/−5 | |
| 19 | Refer | Stroke (SM-screw) | mm | +/−10 | |
| 20 | Applicable | S1 | mm | +/−3 | SM-5 |
| 21 | Applicable | S2 | mm | +/−3 | S1-25 |
| Injection Velocity | | | | | |
| 22 | Applicable | V1 - Injection Speed | mm/s | +/−5 | 65 |
| 23 | Applicable | V2 | mm/s | +/−3 | 5 |
| 24 | Applicable | V3 | mm/s | +/−0 | 20 |
| Injection Pressure | | | | | |
| 25 | Applicable | P1 - Injection Pressure | MPa | +/20 | 145 |
| 26 | Applicable | P2 | MPa | +/−20 | 135 |
| 27 | Applicable | P3 | MPa | +/−20 | 135 |
| 28 | Prepare - TBC | PEAK PRS. (ACT) | MPa | +/−5 | TBC |
| 29 | Applicable | Transfer Position | mm | +/−5 | 25 |
| 30 | Refer | Cushion | mm | 5-15 | 5-15 |
| Pack/Holding | | | | | |
| 31 | Applicable | PP1 - Holding Pressure | MPa | +/−10 | 110 |
| 32 | Applicable | PP2 - Hold Pressure | MPa | +/−10 | 60 |
| 33 | Applicable | PP3 - Hold Pressure | MPa | +/−10 | 40 |
| 34 | Applicable | TP1 - Holding Time | sec | +/−5 | 28 |
| Clamp | | | | | |
| 35 | Applicable | Locking force | Tons | +/−25 | 250 |
| 36 | Refer | Coining at Injection | mm | +/−0.1 mm | 0.37 |
| 37 | Refer | Coining at End of Cycle | mm | 0.03 to 0.1 mm | 0.16 |
| 38 | Applicable | Nitrogen Flow | SCFM | +/−0.3 | 0.70 |

A Design of Experiments (DoE) was conducted to determine key process parameters that affect the base curve as well as the micro-lens global power.

FIG. 1A depicts a top cross section of a generalized view of some features of an injection molding apparatus 100, such as may be used to manufacture a lens. In this apparatus, clamps compress the faces of the mold insert during injection and cooling of the polycarbonate. The coining operation requires precise control of the clamping force. Springs and spacers provide movement in an In Mold Coining (IMC) operation which allows the internal cavity of the mold insert to expand without having to open the mold. This feature allows for improvement of the replication of the front insert, typically the concave insert that has the microstructure, such as a microlens design, that will be replicated onto the front surface of the lens. The IMC helps to better replicate the concave insert design by the added force from springs that are compressed during the injection molding process. This force from the IMC imparts the coining effect that is used to improve the optic and replication of the front curve and micro-lenses to achieve the optics and global power of the lens.

Microstructures may include microlenses or microlenslets or any other type of structure or elements having physical Z deformation/height between 0.1 μm-50 μm and width/length between 0.5 μm-1.5 mm. These structures preferably have periodical or pseudo periodical layout, but may also have randomized positions. The preferred layout for microstructures is a grid with constant grid step, honeycomb layout, multiple concentric rings, contiguous e.g. no space in between microstructures. These structures may provide optical wave front modification in intensity, curvature, or light deviation, where the intensity of wave front is configured such that structures may be absorptive and may locally absorb wave front intensity with a range from 0% to 100%, where the curvature is configured such that the structure may locally modify wave front curvature with a range of +/−20 Diopters, and light deviation is configured such that the structure may locally scatter light with angle ranging from +/−1° to +/−30°.

Figure 1B:
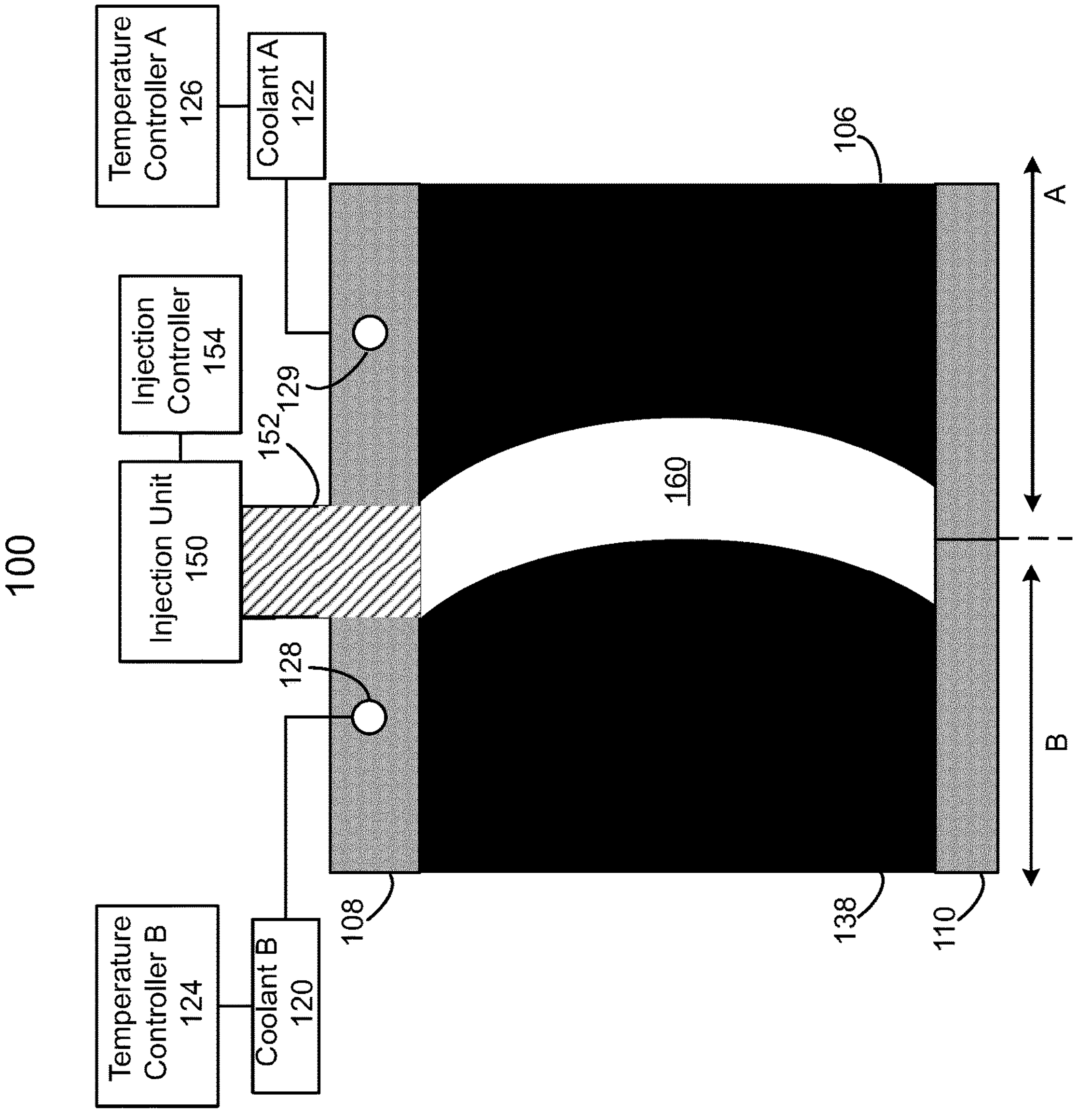
FIG. 1B depicts a block diagram of the control system of an injection molding apparatus, within the scope of the present disclosure.

In FIG. 1A and FIG. 1B, side A and side B indicate the apparatus relevant to the sides of the mold insert formed by mold plates 106 and 138. The mold plate 106 may be patterned with microstructures. An internal mold cavity, 160, between the A side mold plate, 106, and the B side mold plate, 138, receives an injection of polycarbonate resin from injection unit 150 through gate 152. An injection controller 154 controls the injection speed and injection pressure. The injection controller 154 includes speed and pressure sensors for monitoring the injection speed and injection pressure. The injection unit 150 is connected to a resin reservoir, pressure lines and gas source. Injection unit 150 injects the polycarbonate resin through the gate 152 into the internal mold cavity 160 at the injection speed and injection rate set by the injection controller 154, which may be processing circuitry and be implemented by a CPU and memory.

The A side mold plate 106 has an internal concave curve which forms the convex side of the lens. The A side of the mold is held in place in a cylindrical housing by a locking mechanism inside the mold. A locking pin holds the A side of the mold within the cylindrical housing of the mold and can be released to change out the A side of the mold. The B side mold plate 138 has a convex surface which forms the concave side of the lens. Similarly, a locking pin holds the B side of the mold within the cylindrical housing of the mold and can be released to change out the B side of the mold. The pressure is released from the moveable side B of the apparatus to release the lens.

As shown in FIG. 1A, an alignment post 134 is attached to springs $\mathbf{140}_1$ and $\mathbf{140}_2$ separated by a spacer 142. The springs, $\mathbf{140}_1$ and $\mathbf{140}_2$, and spacer 142 are attached to a retainer cup 136 operatively connected to toggle body 130 which compresses the B side mold plate 138 in the In Mold Coining (IMC) operation. As the polycarbonate resin fills the lens cavity 160, the springs, $\mathbf{140}_1$ and $\mathbf{140}_2$, are compressed. As the polycarbonate material solidifies and shrinks, a coining force is imparted through the springs through the B side of the mold. Coining takes place as the springs compress from the pressure generated by the injection cycle in pushing back the B side of the mold, providing the IMC operation which imparts the coining effect. Toggle body alignment post 164 is operatively connected to the toggle body 130 to guide the movement for equal compression of the B mold plate 138. IMC support pillar 162 provides support and guidance to the toggle body alignment post 164.

Even a slight variation in the temperature of the mold insert during molding startup will affect the quality of the lenses. Temperature controllers preheat and keep the mold insert at a temperature set point by circulating coolant (water or oil) through the mold plates. As shown in FIG. 1B, the coolant A may enter first coolant lines at 129 and/or the coolant B may enter second coolant lines at 128. A first temperature controller A, 126, monitors and controls the temperature of the coolant through the A side mold plate 106 and a second temperature controller B, 124, monitors and controls the temperature through the B side mold plate 138. The temperature controller A and the temperature controller B may be embodied in a single temperature controller. Alternatively, the temperature controller may control only one side. This control of the temperature of the mold insert results in smaller variations in mold temperature and more stable molding.

Figure 2:
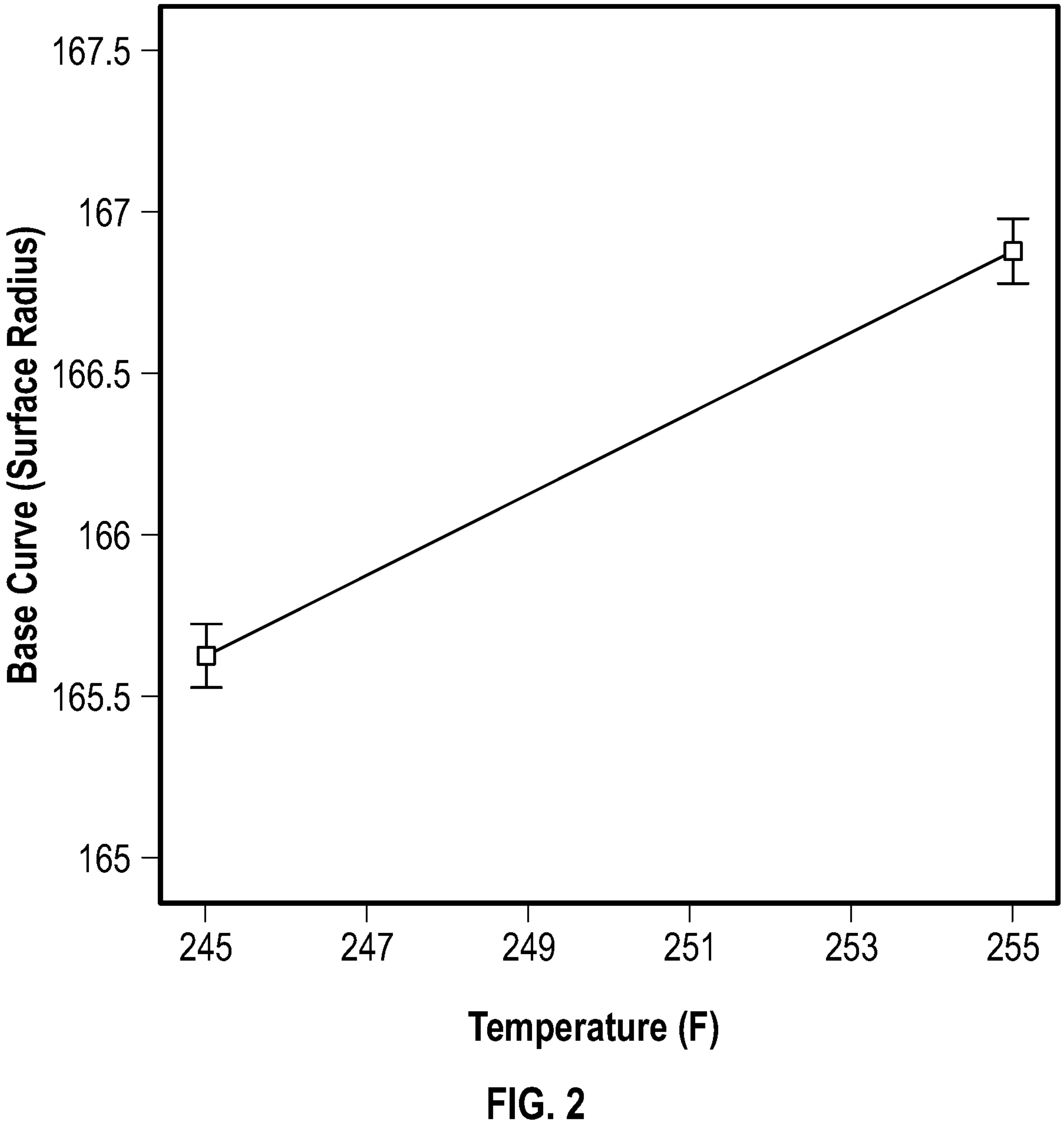
FIG. 2 depicts a graph of surface radius versus temperature for a base curve of an A side of a mold insert, within the scope of the present disclosure.

FIG. 2 shows a graph of base curve surface radius versus temperature (degrees Fahrenheit) for the A side mold plate.

Figure 3:
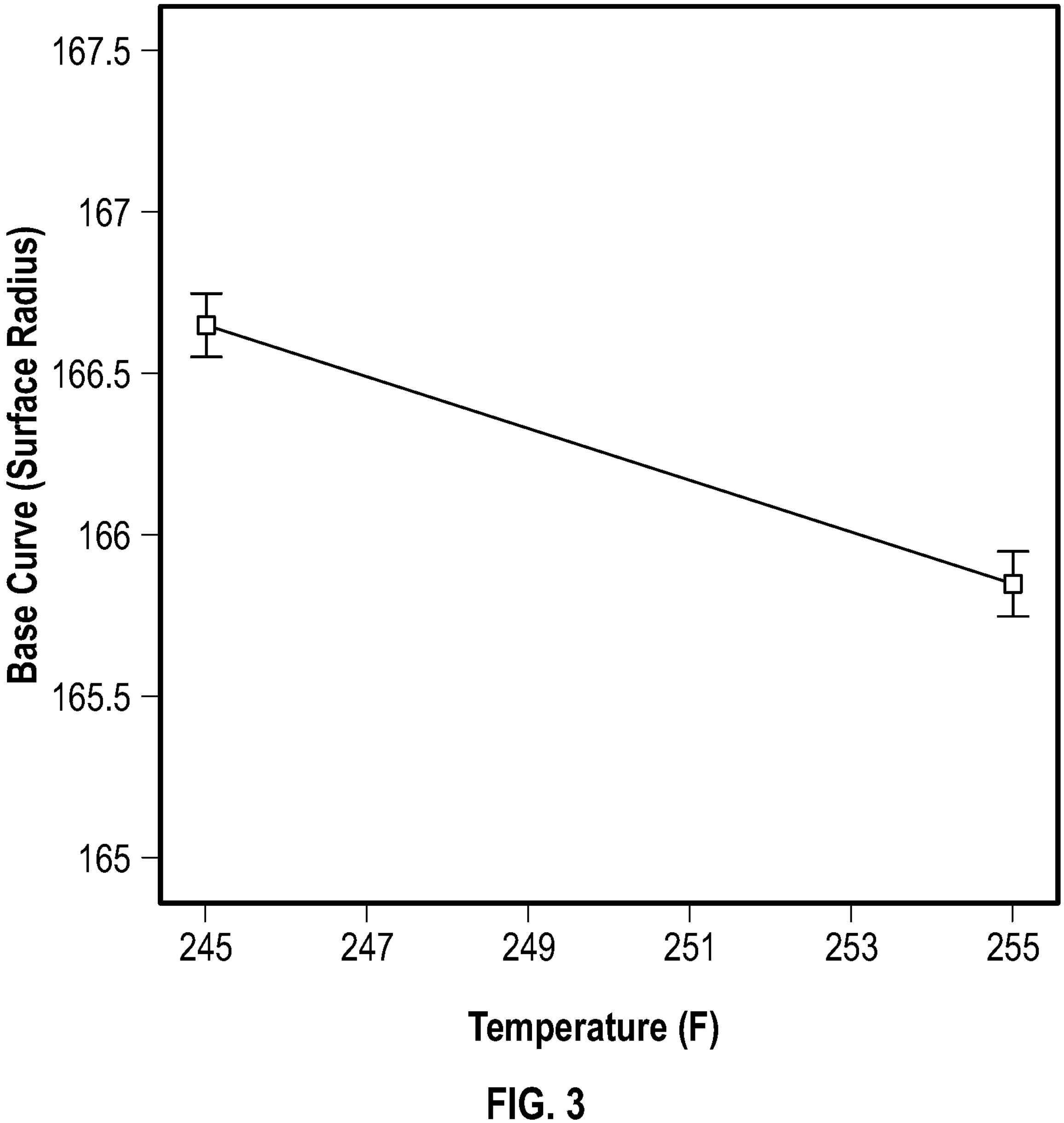
FIG. 3 depicts a graph of surface radius versus temperature for a back curve of a B side of a mold insert, within the scope of the present disclosure.

FIG. 3 shows a graph of base curve surface radius versus temperature (degrees Fahrenheit) for the B side mold plate.

As seen in FIG. 2 and FIG. 3, the mold temperature on the A side mold plate and B side mold plate have a strong impact on the front surface curve. In both FIG. 2 and FIG. 3, the B side mold temperature is 250 degrees Fahrenheit and the coining distance is 0.015 inches. Key results have shown that the temperature of the A side mold plate should be in a range of 4 degrees Fahrenheit to 10 degrees Fahrenheit higher than the temperature of the B side mold plate and that this difference provides a critical effect. The A side mold plate should preferably be in the range of 255 degrees Fahrenheit to 280 degrees Fahrenheit, although the range may be 240 degrees Fahrenheit to 280 degrees Fahrenheit. Most preferably, the temperature of the A side mold plate should be 255 degrees Fahrenheit. The temperature of the B side mold plate should preferably be in a range of 240 degrees Fahrenheit to 275 degrees Fahrenheit, more preferably in a range of 250 degrees Fahrenheit to 257 degrees Fahrenheit; and most preferably 250 degrees Fahrenheit.

Another important aspect is that the coining impacts the average global departure of the micro-lens (μL). Because of the large number of micro-lens on the lens surface, the difference between the nominal expected global power of the micro-lens and the measured value of the micro-lens is used to calculate the average global micro-lens departure.

Figure 4:
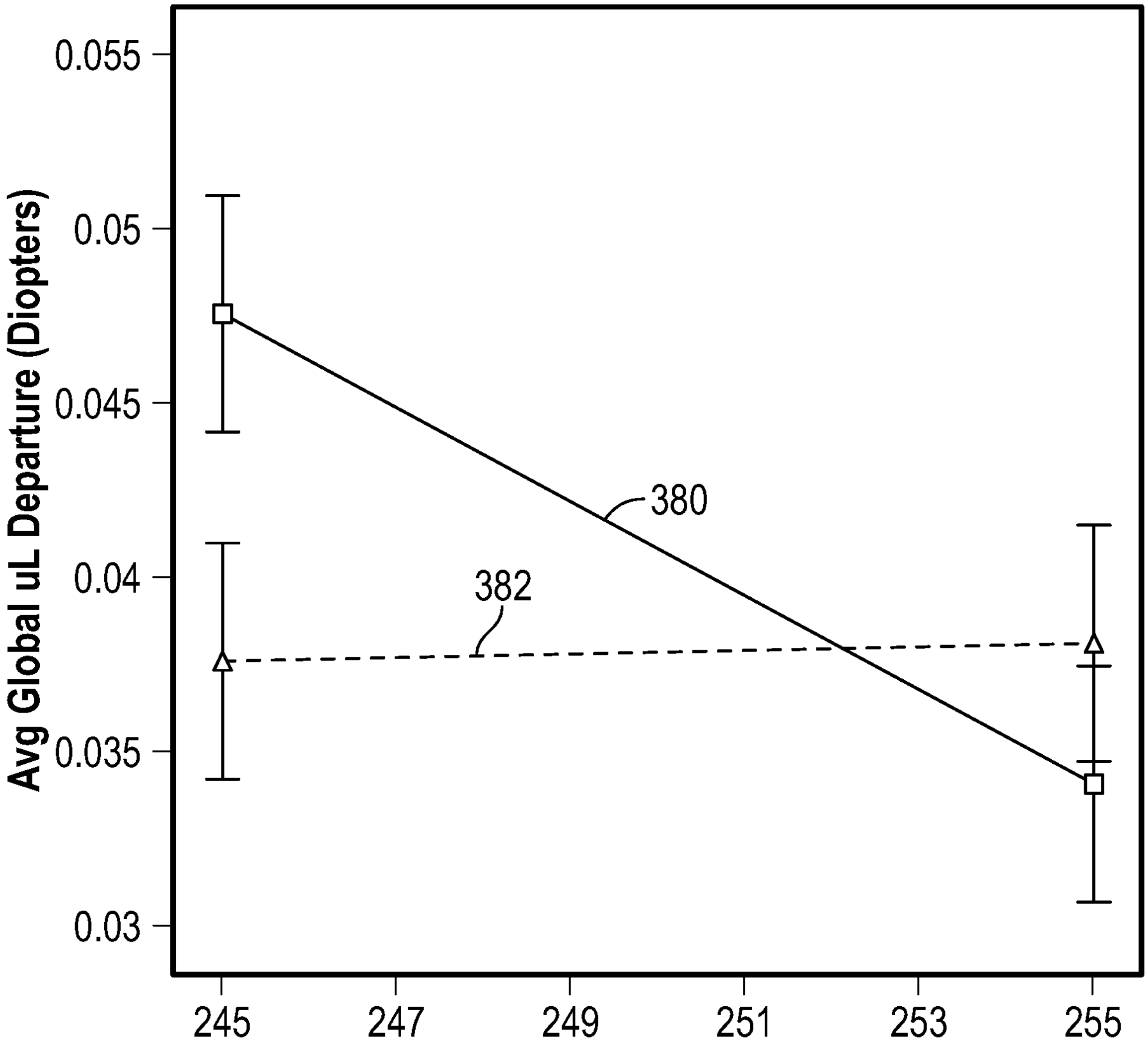
FIG. 4 depicts a graph of global power versus temperature for both an A side of the mold insert and a B side of the mold insert, within the scope of the present disclosure.

FIG. 4 is a graph of the average global micro-lens (μL) departure in diopters and the B-side mold temperature interaction of average global departure versus B side mold temperature at 250 degrees Fahrenheit for coining of 0.013 inches (curve 380) and 0.017 inches (curve 382). If the coining and pack pressure are high enough, such as for 0.017 inches coining, then B side mold temperature may not be as critical. However, if the coining and pack pressure are reduced to the 0.013 inches range, then the B side mold temperature has a greater impact on the average global micro-lens departure. Thus, the results of FIG. 4 show the interaction between the temperature and pressure, and their effect on average global micro-lens departure.

The process of making a lens, such as the Stellest™ lens, was developed through a design of experiments to achieve not only a good front surface curve but also the global power of the micro-lens array to produce a lens within the specifications. The design of experiments has indicated the temperature of the mold, both the A-side and the B-side, plays an important role in achieving the front curve of the lens. As FIGS. 2 and 3 show, having a higher temperature on the A-side and a lower temperature on the B-side of the mold achieves a lens having front curve design closer to 167 mm. radius. As a result, the process parameter setting requires the A-side mold temperature to be in a range of 4 degrees Fahrenheit to 10 degrees Fahrenheit higher than the B-side of the mold. These results will help to improve production of future lenses.

The coining during the processing has also been found to be a factor that affects the global micro-lens power. A higher coining force becomes more critical when the B-side mold temperature is lower than 250 F, as seen in FIG. 4. The use of a higher B-side mold temperature allows for a lower coining force to be used. To minimize the departure of the micro-lens global power a higher coining force of 0.017" along with higher B-side mold temperature can be used. The coining can range from 0.008 inch to 0.018 inch.

The process parameters are designed to be used by injection molding production facilities in a mass production environment that would produce these specialty type lenses, such as the Stellest™ lens, that not only have a center front curve but also an array of microstructures such as micro-lenslets surrounding the center spherical front curve.

The process would be implemented at mass production facilities for injection molding ophthalmic lenses to support maintaining optic and global power within specification.

The process would be implemented at mass production facilities for injection molding ophthalmic lenses to achieve good reproducibility by keeping production process capability values, Cpk or Cp>1.0.

This set of process parameters can be used to help manage tighter specifications for optics/global power of future products.

If inserts are made within the given specification, then the developed process parameters shown in Table 2 will achieve a lens within optical and global power specifications.

TABLE 2

3.25 B SFSV Optimal Molding Parameters

| Parameter | Units | Value | Tolerance |
|---|---|---|---|
| A Mold Temp | (° F.) | 255 | +/−5 |
| B Mold Temp | (° F.) | 250 | +/−5 |
| Pack Pressure | (PSI) | 11,250 | +/−1500 |
| Coining Compression | (in) | 0.013 | — |
| Resin | — | Teijin 1250ZT | — |
| Molding Machine | — | Nissei ES | — |
| Convex Insert Radius | (mm) | 86.815 | — |
| Screw Diameter | (mm) | 50 | — |
| Shot Size | (mm) | 150 | — |
| Fill Time | (sec) | 17 | +/−5 |
| Injection Time | Seconds | 60 | +/−5 |
| Barrel Temperature | (° F.) | 550 | +/−5 |
| Press. Chg. Pos. | (mm) | 20 | +/−5 |
| Cooling Time | (sec) | 250 | +/−10 |
| Cycle Time | (sec) | 315 | +/−15 |
| Inj. Velocity 1 | (mm/s) | 4.5 | +/−2 |
| Inj. Velocity 2 | (mm/s) | 10.5 | +/−2 |

Temperature difference from A side to B side mold temp. in the range of 4 degrees F. to 10 degrees F.

An area for improvement may be adjustment in the process parameters when inserts have gone through significant production quantity with physical wear taking place on the insert. The design of experimental results may help in determining what key factors can potentially be used and adjusted to allow the worn inserts to produce lens that are still within optical and micro-lens global power specification.

Standard SFSV process conditions, as shown in Table 1, have been considered for producing the lens, since the lens design consists of the SFSV front curve as well as a micro-lens array surrounding the spherical center design.

In the preceding description, specific details have been set forth, such as a particular geometry of an injection molding system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than specifically described unless expressly indicated otherwise. Various additional operations may be performed and/or described operations may be omitted.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals. (1) A method for injection-compression molding a lens into a mold insert including an internal cavity 160, a sidewall 108, and a gate 152, the method comprising injecting a polymer into the internal cavity formed by a coupled first mold side 106 and second mold side 138 of the mold insert via the gate until a pressure of the internal cavity exceeds a predetermined force value, the first mold side being fixed and the second mold side being moveable and configured to apply a force generating the internal cavity pressure; and wherein the method further comprises controlling a first temperature of the first mold side to be in a range of 4 degrees Fahrenheit to 10 degrees Fahrenheit greater than a second temperature of the second mold side and controlling a coining compression distance of the second mold side to be in a range of 0.008 inches to 0.018 inches.

(2) The method of (1), further comprising controlling the first temperature of the first mold side to be preferably in a range of 245 degrees Fahrenheit to 280 degrees Fahrenheit, more preferably in a range of 250 degrees Fahrenheit to 263 degrees Fahrenheit; and most preferably 255 degrees Fahrenheit; and controlling the second temperature of the second mold side to be preferably in a range of 240 degrees Fahrenheit to 275 degrees Fahrenheit, more preferably in a range of 250 degrees Fahrenheit to 257 degrees Fahrenheit; and most preferably 250 degrees Fahrenheit.

(3) The method of either (1) or (2), wherein the coining compression distance of the second mold side is inversely related to the second temperature of the second mold side. (As shown in FIG. 4, curve 380)

(4) The method of any of (1) to (3), flowing coolant at the first temperature through a first coolant channel in the first mold side; and flowing coolant at the second temperature through a second coolant channel in the second mold side.

(5) The method of any of (1) to (4), further comprising: selecting the predetermined force value from a range of preferably 9,000 psi to 15,000 psi, more preferably in a range of 10,000 psi to 13,000 psi, and most preferably 12,000 psi.

(6) The method of any of (1) to (5), further comprising: injecting the polymer for an injection time in a range of 20 seconds to 80 seconds, preferably 52 seconds; and cooling the polymer for a cooling time in a range of 200 seconds to 260 seconds, preferably 240 seconds.

(7) The method of any of (1) to (6), further comprising injecting and cooling the polymer in the internal cavity for an injection cycle time in a range of 220 seconds to 330 seconds, preferably 315 seconds.

(8) An injection-compression molding apparatus 100 for molding a lens, comprising: a mold insert having a first mold side 106, a second mold side 138 and an internal cavity 160 formed between the first mold side and the second mold side, the first mold side being fixed and the second mold side being moveable; a gate 152 connected to the internal cavity; an injection unit 150 connected to the gate, the injection unit configured to inject a polymer into the internal cavity 160;

a coolant channel in the first mold side 106 and/or in the second mold side 138; temperature controller circuitry 126 connected to the coolant channel and configured to control a temperature of a coolant in the coolant channel; springs and spacers configured to control a coining compression distance of the second mold side to be in a range of 0.008 inches to 0.018 inches.

(9) The injection-compression molding apparatus of (8), further comprising: a set of springs ($\mathbf{140}_1$, $\mathbf{140}_2$) and metal spacers (142) enclosed by a retainer cup (136) and connected to the moveable side of the mold by the toggle body.

(10) The injection-compression molding apparatus of either (8) or (9), wherein the polymer is a polycarbonate resin.

(11) The injection-compression molding apparatus of any one of (8) to (10), further comprising an injection pressure sensor connected to the internal cavity, such that the injection pressure sensor is configured to measure an internal cavity pressure; and wherein the injection unit is configured to inject the polymer into the internal cavity until the internal cavity pressure exceeds a predetermined force value.

(12) The injection-compression molding apparatus of any one of (8) to (11), further comprising an injection controller configured to select the predetermined force value from a range of preferably 9,000 psi to 15,000 psi, more preferably a range of 10,000 psi to 13,000 psi, and most preferably 12,000 psi.

(13) The injection-compression molding apparatus of any one of (8) to (12), wherein the coolant channel is in the first mold side 106 as a first coolant channel 129 and in the second mold side 138 as a second coolant channel 128 and the first coolant channel has a first coolant 122 and the second coolant channel has a second coolant 120, the temperature controller circuitry is configured to control the first temperature of the first coolant 122 to be preferably in a range of 245 degrees Fahrenheit to 280 degrees Fahrenheit, more preferably in a range of 250 degrees Fahrenheit to 265 degrees Fahrenheit; and most preferably 255 degrees Fahrenheit; and the temperature controller is configured to control a second temperature of the second coolant 120 to be preferably in a range of 240 degrees Fahrenheit to 280 degrees Fahrenheit, more preferably in a range of 250 degrees Fahrenheit to 257 degrees Fahrenheit; and most preferably 250 degrees Fahrenheit.

(14) An injection-compression molding system for molding a lens, comprising: a mold insert having a first mold side 106, a second mold side 138 and an internal cavity 160 formed between the first mold side and the second mold side, the first mold side being fixed and the second mold side configured to be moveable; an injection unit 150 configured to inject a polymer into the internal cavity; a temperature controller connected to the first mold side, and the second mold side, wherein the temperature controller is configured to control a first temperature of the first mold side and to control a second temperature of the second mold side, wherein the first temperature is in a range of 4 degrees Fahrenheit to 10 degrees Fahrenheit higher than the second temperature; and springs and spacers body configured to control a coining compression distance of the second mold side to be in a range of 0.008 inches to 0.018 inches.

(15) The injection-compression molding system of (14), wherein the temperature controller is configured to control the first temperature of a first coolant (122) to be preferably in a range of 245 degrees Fahrenheit to 280 degrees Fahrenheit, more preferably in a range of 250 degrees Fahrenheit to 263 degrees Fahrenheit; and most preferably 255 degrees Fahrenheit; and the temperature controller is configured to control the second temperature of a second coolant 120 to be preferably in a range of 240 degrees Fahrenheit to 275 degrees Fahrenheit, more preferably in a range of 250 degrees Fahrenheit to 257 degrees Fahrenheit; and most preferably 250 degrees Fahrenheit.

Although representative processes and articles have been described in detail herein, those skilled in the art will recognize that various substitutions and modifications may be made without departing from the scope of what is described and defined by the appended claims.

The invention claimed is:

1. An injection-compression molding apparatus for molding a lens, comprising:

a mold insert having a first mold side having a concave surface patterned with microstructures, wherein the microstructures have a height between 0.1 μm-50 μm, a width of between 0.5 μm-1.5 mm, and a length of between 0.5 μm-1.5 mm and are arranged in multiple concentric rings, with no space between the microstructures;

a second mold side having a convex surface, wherein the concave surface and the convex surface face each other, and an internal cavity formed between the concave surface of the first mold side and the convex surface of the second mold side, the first mold side being fixed and the second mold side being moveable;

a gate connected to the internal cavity;

an injection unit connected to the gate, the injection unit configured to inject a polymer into the internal cavity;

an alignment post:

springs attached to the alignment post; and at least one spacer, wherein the at least one spacer is positioned between the springs.

2. The injection-compression molding apparatus of claim 1, further comprising:

an injection pressure sensor communicating with the internal cavity.

3. The injection-compression molding apparatus of claim 2, further comprising:

an injection controller connected to a resin reservoir, pressure lines and gas source.

4. The injection-compression molding apparatus of claim 1, further comprising:

a first coolant channel in the first mold side and a second coolant channel and in the second mold side.

5. An injection-compression molding system for molding a lens, comprising:

a mold insert having a first mold side having a concave surface patterned with microstructures, wherein the microstructures have a height between 0.1 μm-50 μm, a width of between 0.5 μm-1.5 mm, and a length of between 0.5 μm-1.5 mm and are arranged in a pattern multiple concentric rings, with no space between the microstructures;

a second mold side having a convex surface, wherein the concave surface and the convex surface face each other, and an internal cavity formed between the concave surface of the first mold side and the convex surface of the second mold side, the first mold side being fixed and the second mold side configured to be moveable;

an injection unit configured to inject a polymer into the internal cavity;

a temperature controller connected to the first mold side and a second mold side;

an alignment post;

springs attached to the alignment post; and at least one spacer, wherein the at least one spacer is positioned between the springs.

* * * * *